Dec. 8, 1942.   P. S. WILLIAMS   2,304,324
GRAVITY METER
Filed July 27, 1939
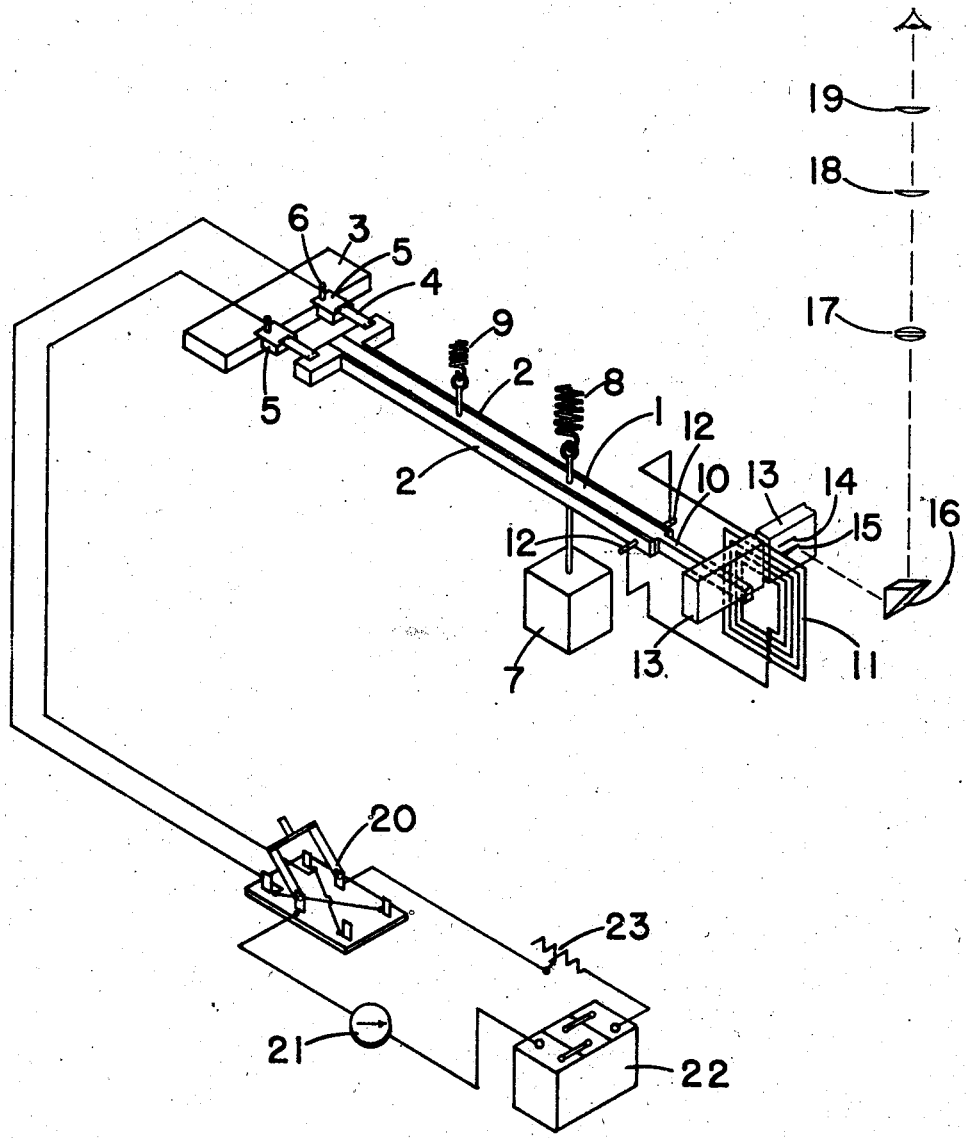
Philip S. Williams INVENTOR.
BY
P. L. Young ATTORNEY.

Patented Dec. 8, 1942

2,304,324

UNITED STATES PATENT OFFICE 2,304,324

GRAVITY METER

Philip S. Williams, Tulsa, Okla., assignor to Standard Oil Development Company, a corporation of Delaware Application July 27, 1939, Serial No. 286,761

3 Claims. (Cl. 265—1.4)

The present invention is directed to a gravity meter and particularly to that type of gravity meter in which the gravity measuring system includes a weight carried by a pivoted beam supported by one or more springs.

One of the inherent difficulties with gravity meters of the aforesaid type, which bears a close relation to the sensitivity of the meter, is the fact that responsiveness of the weight to changes of gravity depend upon the angle which the beam makes with the horizontal. That is to say, the deflection of the beam from the horizontal does not bear a linear relation to changes of gravity, whereby calibration of the meter is rendered difficult. Another disturbing influence in meters of this type is the fact that the spring or springs will not always be distorted the same amount by a given change of gravity, but because of an effect somewhat akin to a hysteresis effect the amount of distortion of the spring for a given change in gravity will often depend upon the previous position or condition of the spring. Reciting a specific case, in any particular equilibrium position reading, the instrument may show a hysteresis effect due to the recent swing of the moving system from its position when clamped for transit. The effect will be roughly proportional to the difference between these configurations and thus will vary for readings at stations of varying gravity values.

The principal object of the present invention is the provision of a gravity meter of the general type referred to above in which means are provided to render the reading of the meter independent of the factors hitherto found objectionable. More specifically, it is the object of the present invention to provide a null point reading gravity meter in which changes of gravity are measured as electrical values which in turn are made dependent upon a force necessary to restore the moving system of the gravity meter, after deflection by gravity, to its null position.

The present invention will be more fully understood from the following detailed description of the accompanying drawing in which the single figure is a perspective view, in diagrammatic form, of one embodiment of the present invention as applied to a conventional type of gravity meter.

Referring to the drawing in detail, numeral 1 designates a beam of insulating material having fixed to each of its sides a strip of conducting material 2. The inner end of the beam is hinged to a fixed support 3 by spring hinges 4 connecting the aforesaid metal strips 2 to metal plates 5 on the fixed support 3. The metal plates carry binding posts 6. Fixed to the beam 1 and suspended therefrom is a weight 7 which is counterbalanced by a spring 8. Also fixed to the beam at a point closer to its fulcrum is a fine spring 9 which is used for fine adjustments. Thus far the arrangement described is essentially that shown in Figure 1 of Reissue Patent No. 20,137, issued October 20, 1936, to Kenneth Hartley.

At its outer end the beam 1 has an extension 10 in which is mounted a coil 11 which is preferably a flat coil lying in the plane of the longitudinal axis of beam 1 and vertically arranged. This coil is connected to binding posts 12 carried by the metal strips 2. The coil is arranged in the field of a pair of permanent magnets 13 which are secured to the frame work of the gravity meter with pole faces parallel with the plane of the coil. One of the pole pieces is provided with a mark 14 and the coil carries a pointer 15 which is adapted to coincide with the mark when the beam is in its null position. An optical system, including a triangular prism 16 and lenses 17, 18 and 19, is focused on the mark 14.

Attached to the binding posts 6 are the terminals of a circuit including a reversing switch 20, a meter 21, a battery 22 and an adjustable resistance 23. The switch 20 is provided so that current may be sent through the coil in either direction.

In using the system descrbed above, the gravity meter is set up at a base station and the current from battery 22 is adjusted by resistance 23 so as to bring the pointer 15 in coincidence with line 14, and meter 21 is read. The circuit is then opened and the meter is moved to a field station where the process is repeated: resistance 23 is again adjusted to bring the pointer 15 coincident with line 14 and the meter 21 is read. The difference between the current required for this null point setting at the field station and that at the base station is taken as a direct function of the difference in gravity between the two stations. It is obvious, of course, that the difference in the two resistance settings can also be taken as a direct function of the difference in gravity between the two stations.

In practice it is preferred that the magnets be of the permanent type although electrical magnets may be employed. It is also preferred to make the distance from the coil through the fulcrum as large as possible since the small null setting force preferred for a given gravitational pull will be inversely proportional to this distance.

The reversibility of the deflecting force by reversing the current, together with the consequent fact that the system works around a state of zero force, contributes to the accuracy of the measurements. That is, a gravity range of say 1000 units, may be covered with an absolute current range of five hundred units. This feature minimizes also the demands on the constancy of the magnetic field. Finally, such an arrangement is extremely simple insofar as construction of the moving system of the gravity meter is concerned.

The manner in which this null setting system tends to remove the difficulties hereinbefore referred to is fairly evident. The hysteresis effect is naturally minimized by having the moving system in the same position for all readings since consequently the spring tensions are always the same. Furthermore, the reading position can be made close to the clamped position or, for certain constructions, coincident with it. The calibration of the instrument is taken out of the domain of the gravity meter proper and made to depend on electrical and magnetic arrangements, and the functioning of the latter is well understood and controllable. The only requirement on the meter proper is that the equilibrium position of the moving system, other things being constant, change sufficiently with changes in gravitational pull so that the optical, or other observational error, in setting the system to the null position will represent a negligible error in the corresponding gravity value. In fact, most of the elements on which the calibration will depend can be physically separate from the gravity meter proper and hence be readily accessible for check or adjustment. It will also be noted that the spatial uniformity of the magnetic field between the pole pieces cannot affect the linearity of the reading since the coil is in the same position relative to the magnetic structure for all readings.

The improvement of the present invention makes the gravity meter readily adaptable to remote reading. When this is desired, it is necessary to replace the optical means for observing null point by an electrical means. This can easily be done by arranging an electrical circuit which is closed when the beam is in its null point in a manner already known.

Many possible configurations of coil and magnetic structure will occur to those skilled in the art. Such modifications are contemplated within the scope of the present invention which is not limited to the specific embodiment shown, but is defined in the appended claims in which it is intended to claim the invention as broadly as the prior art permits.

What is claimed is:

1. In a gravity meter having a pivoted beam carrying a weight responsive to gravity changes, in combination, a flat coil carried by a free end of said beam and arranged in the plane of movement of said beam, a pair of pole pieces mounted on either side of said coil with their faces parallel with the plane of said coil, a source of current connected to said coil and means for indicating the amount of current supplied to said coil.

2. A combination according to the preceding claim in which one of said poles carries a mark indicating the null position of the beam and the coil carries a pointer adapted to cooperate with said mark to indicate the null position of said beam.

3. In a gravity meter having a pivoted beam carrying a weight responsive to gravity changes and provided with a system of springs attached to said beam to oppose said weight, in combination, a flat coil carried by a free end of said beam and arranged in the plane of movement of said beam, a pair of pole pieces mounted on either side of the coil with their faces parallel with the plane of said coil, a source of direct current connected to said coil by an electric circuit including means for regulating and indicating the amount of current supplied to said coil, and means for reversing the direction of flow of current in said coil.

PHILIP S. WILLIAMS.